US008201579B2

(12) United States Patent
Schmid et al.

(10) Patent No.: US 8,201,579 B2
(45) Date of Patent: Jun. 19, 2012

(54) CONVEYING CHAMBER HOSE FOR A DEVICE FOR CONVEYING FLUID AND A DEVICE FOR CONVEYING FLUID WITH THE CONVEYING CHAMBER HOSE

(75) Inventors: Réne Schmid, Hinterforst (CH); Daniel Ziwica, Arbon (CH); Karsten Jüterbock, Wangen (DE)

(73) Assignee: J. Wagner AG, Altstatten (CH)

( * ) Notice: Subject to any disclaimer, the term of this patent is extended or adjusted under 35 U.S.C. 154(b) by 500 days.

(21) Appl. No.: 12/041,719

(22) Filed: Mar. 4, 2008

(65) Prior Publication Data

US 2008/0219780 A1 Sep. 11, 2008

(30) Foreign Application Priority Data

Mar. 5, 2007 (EP) .................................... 07405070

(51) Int. Cl.
*B65G 53/54* (2006.01)

(52) U.S. Cl. .......................... 137/613; 138/44; 406/196

(58) Field of Classification Search .................. 137/613; 138/39, 40, 44-46; 251/4, 7, 8; 406/196, 406/197, 144

See application file for complete search history.

(56) References Cited

U.S. PATENT DOCUMENTS

| | | | | |
|---|---|---|---|---|
| 4,307,754 | A * | 12/1981 | Muratsubaki | 138/108 |
| 4,523,738 | A * | 6/1985 | Raftis et al. | 251/4 |
| 6,607,010 | B1 * | 8/2003 | Kashy | 138/121 |
| 7,150,585 | B2 * | 12/2006 | Kleineidam et al. | 406/50 |
| 2002/0014607 | A1 * | 2/2002 | Abromaitis | 251/7 |
| 2007/0095945 | A1 | 5/2007 | Keudell et al. | |

FOREIGN PATENT DOCUMENTS

| | | |
|---|---|---|
| DE | 103 53 968 | 7/2005 |
| DE | 10 2005 006 522 | 8/2006 |

OTHER PUBLICATIONS

European Search Report for corresponding Application No. EP 07 40 5070 dated May 4, 2007.

* cited by examiner

*Primary Examiner* — Kevin Lee

(74) *Attorney, Agent, or Firm* — Renner, Otto, Boisselle & Sklar, LLP

(57) ABSTRACT

A conveying chamber hose for a device for conveying fluid is embodied in an elastic manner, has an inlet and an outlet and has the smallest resistance in the area of the inlet.

11 Claims, 3 Drawing Sheets

CONVEYING CHAMBER HOSE FOR A DEVICE FOR CONVEYING FLUID AND A DEVICE FOR CONVEYING FLUID WITH THE CONVEYING CHAMBER HOSE

RELATED APPLICATION

The present application claims priority under 35 U.S.C. §119 to European Patent Application No. 07 405 070.9, filed on Mar. 5, 2007, the entire disclosure of which is incorporated herein by reference.

TECHNICAL FIELD

The invention relates to a conveying chamber hose for a device for conveying fluid and a device for conveying fluid with the conveying chamber hose.

The fluid can be for example coating powder. In order to coat the objects or work pieces with coating powder, the coating powder (or powder for short) is conveyed from a powder reservoir with the help of a powder conveying device to a powder spray gun and there sprayed on the work piece with the powder spray gun. Alternatively, the coating powder can be conveyed with the powder conveying device from the powder reservoir into a dosing container and from there to the powder spray guns with several individual pumps.

BACKGROUND OF THE INVENTION

A device for conveying coating powder and a method for conveying powder with the conveying device is known from the German Patent DE 10 2005 006 522 B3. The conveying device has an inlet valve, an outlet valve and a conveying chamber formed from an elastic conveying chamber hose. The powder conveying chamber is arranged between the inlet valve and the outlet valve and has a conveying air inlet. Moreover, the volume of the powder conveying chamber can be modified by changing the dimensions of the conveying hose.

SUMMARY OF THE INVENTION

An object of the invention is to provide a conveying chamber hose for a device for conveying fluid, in which it is ensured that the fluid present in the conveying chamber hose can be conveyed completely out of the conveying chamber hose. The material transport should be optimized with the help of the conveying chamber hose.

Another object is to provide a device for conveying fluid with the conveying chamber hose, in which it is also ensured that the fluid present in the conveying chamber hose is completely conveyed out of it.

The conveying chamber hose according to the invention for a device for conveying fluid is embodied in an elastic manner, has an inlet and an outlet and the minimum resistance in the area of the inlet.

The device according to the invention for conveying fluid includes a conveying chamber hose, which is embodied in an elastic manner, which has an inlet and an outlet, and which has the minimum resistance in the area of the inlet. Moreover, the device includes an inlet valve and an outlet valve, wherein the inlet valve and the outlet valve can be controlled. The conveying chamber hose forms a conveying chamber, which is arranged between the inlet valve and outlet valve, which has a conveying air inlet and whose volume can be changed by changing the dimensions of the conveying chamber hose.

In a further development of the conveying chamber hose according to the invention, the hose has a taper in the area of the inlet. Advantageously this can be produced easily.

In an additional further development of the conveying chamber hose according to the invention, one or more tapers are provided in the area of the inlet. Thus, it is achieved that the conveying chamber hose is lying in a defined position in the relaxed condition on the inside of the casing. As a result the conveying chamber of the conveying chamber hose has the original volume again each time when the conveying chamber hose comes back into the relaxed condition.

In an embodiment of the hose according to the invention, a recess is provided in the hose, which becomes smaller from the inlet towards the outlet. As in the previous embodiment, in this way it is achieved that the conveying chamber hose is lying in a defined position in the relaxed condition on the inside of the casing. As a result the conveying chamber of the conveying chamber hose has the original volume again each time when the conveying chamber hose comes back into the relaxed condition.

In another embodiment of the conveying chamber hose according to the invention, several layers are provided, whereby the thickness of at least one of the layers increases from the inlet to the outlet. Hereby, the complete emptying or pushing out of the powder from the conveying chamber hose is sustained.

Advantageously the wall thickness from the inlet towards the outlet increases in the conveying chamber hose according to the invention.

Additionally or alternatively to it the conveying chamber hose according to the invention can also have a reinforcement. The reinforcement is arranged preferably in the central area and in the area of the outlet.

According to another characteristic of the invention, the cross-section of the conveying chamber hose can also be oval.

In addition, in the conveying chamber hose according to the invention, the internal diameter of the conveying chamber hose can decrease from the inlet towards the outlet.

Finally, in the device according to the invention for conveying fluid, another conveying chamber formed from another conveying chamber hose can be provided, such conveying chamber being arranged between another inlet valve and another outlet valve. The conveying chamber has a conveying air inlet and its volume can be changed by changing the dimensions of the other conveying chamber hose. The outlet valves are connected to each other on the outlet side.

The inlets of the two inlet valves can also be connected to each other.

BRIEF DESCRIPTION OF THE DRAWINGS

In the following, the invention will be elucidated in detail with reference to several embodiments with the help of 10 figures.

DETAILED DESCRIPTION OF THE DRAWINGS

Figure 1:
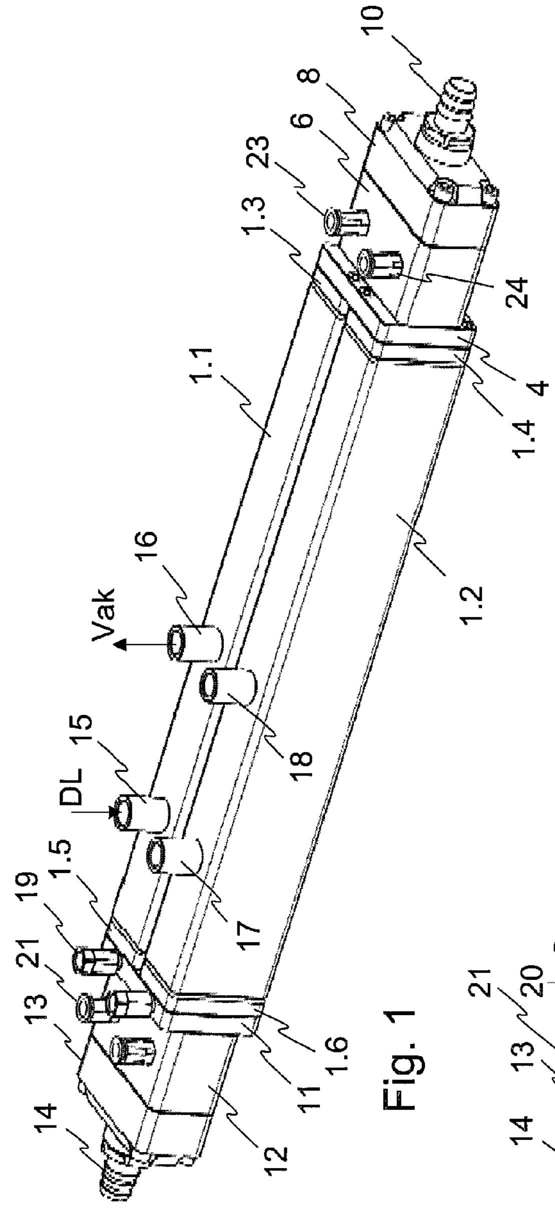
FIG. 1 shows a possible embodiment of the device according to the invention for conveying fluid in a three-dimensional view.
Figure 2:
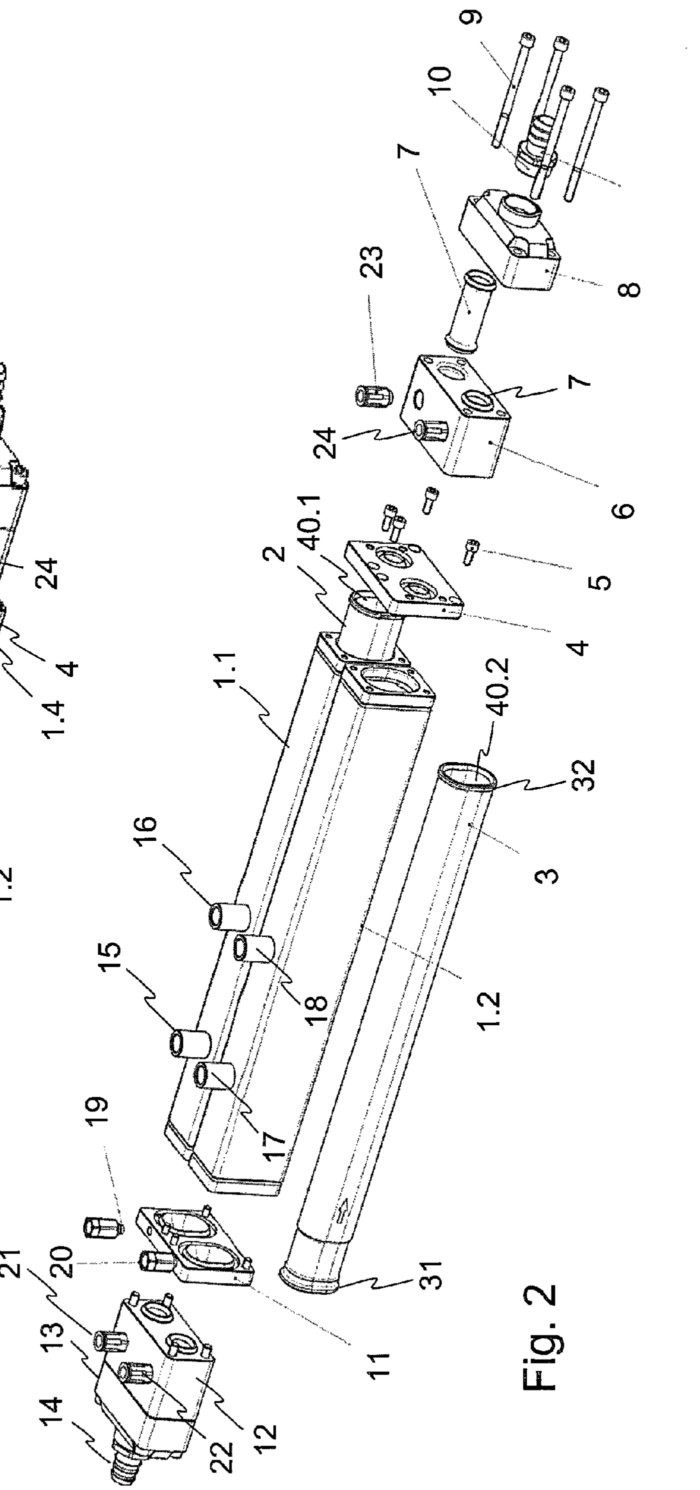
FIG. 2 shows the conveying device in an exploded view.

FIG. 1 shows a three-dimensional view of a possible embodiment of the device according to the invention for conveying fluid. In FIG. 2 this embodiment of the conveying device is shown in an exploded view. Fluid, for example powdery coating material for coating work pieces, can be conveyed with the help of the conveying device, which is also called pump. For this, the conveying device is connected to the suction pipe via a hose nipple 14 in order to suck powder from a powder reservoir. The conveying device is connected, on the outlet side, via a hose nipple 10, to a conveying pipe in order to convey the powder to a dosing container or a powder spray gun. The powder reservoir, the suction pipe, the conveying pipe and the dosing container and respectively the powder spray gun are not shown in the FIGS. 1 and 2. If the conveying device according to the invention conveys the powder from the powder reservoir to the dosing container, other pumps are normally provided in order to subsequently convey the powder from the dosing container to the individual powder spray guns.

The embodiment of the conveying device shown in the FIGS. 1 and 2 has two conveying units that can be operated independent of each other. Both conveying units are arranged parallel to each other.

The first conveying unit includes a conveying chamber hose 2 arranged in a housing 1.1 (see FIG. 2). The housing 1.1 has a housing cover 1.5 on the inlet side and a housing cover 1.3 on the outlet side. The two housing covers 1.5 and 1.3 have a preferably oval opening, in which the conveying hose 2 projects.

The design of the second conveying unit is the same as the one of the first conveying unit. It includes a housing 1.2, in which another conveying chamber hose 3 is arranged. The housing 1.2 has a housing cover 1.6 on the inlet side and a housing cover 1.4 on the outlet side.

The two hoses 2 and 3 are fixed on the inlet side with the help of a flange 11 and of the two housing covers 1.5 and 1.6. Another flange 4 is located on the outlet side of the two conveying units and the two hoses 2 and 3 are fixed on the outlet side with such a flange 4. The two flanges 4 and 11 are screwed together with the housing covers 1.3, 1.4, 1.5 and 1.6 respectively, using screws 5. The flange 11, arranged on the inlet side of the two conveying units, has a conveying air connection 19 for the first conveying unit and a conveying air connection 20 for the second conveying unit. The two conveying air connections 19 and 20 can be equipped with a non-return valve each. A Y piece 13 is arranged between the hose nipple 14, with which the hose pipe leading to the powder reservoir can be connected, and the flange 11. The powder, which is sucked from powder reservoir via the suction pipe, is distributed evenly to the two downstream conveying units with the help of the Y piece. Each of the two conveying units has an inlet valve each. The inlet valve for the first conveying unit can be controlled using a control connection 21. The second conveying unit also has an inlet valve on the inlet side, which can be controlled using a control connection 22. The two inlet valves are accommodated in a common housing 12.

The first conveying unit has an outlet valve on the outlet side, which can be controlled using a control connection 23. The second conveying unit also has an outlet valve on the outlet side, which can be controlled using a control connection 24. The two outlet valves are accommodated in a common housing 6.

The two inlet valves and the two outlet valves are developed as inner tube valves for the embodiment shown in the FIGS. 1 and 2. In the exploded view in FIG. 2 the valve hose 7, for the purpose of representation in the case of the outlet valve, is shown once in the inserted condition and once in the removed condition. If the outlet valve is loaded with compressed air using the control pipe 24, the valve hose 7 is compressed. The cross-section of the valve hose can be reduced, with the help of the compressed air DL, to such an extent that no fluid can flow through the valve. By analogy, the same applies to the other outlet valve and the two inlet valves.

The outlets of the two outlet valves are brought together with the help of another Y piece 8 and led into a common powder outlet, which can be connected with the conveying pipe using the hose nipple 10. The Y piece 8 and the two outlet valves are fixed with several screws 9 on the flange 4. The Y piece 13 and the two inlet valves are fixed with several screws on the flange 11.

The housing 1.1 has a compressed air connection 15, via which compressed air DL can flow inside the housing. The compressed air DL causes the compressed air chamber, which is located between the housing inner side and the conveying chamber hose 2, to stretch and so that the conveying chamber hose 2 is compressed. This on the other hand leads to the fact that the volume in the conveying chamber hose 2 decreases. A low pressure can be generated in the housing 1.1, using another connection 16, by sucking the air from the compressed air chamber. The low pressure Vak ensures that the conveying chamber hose 2 is brought into the same defined initial position again and again. Moreover, with the aid of the low pressure Vak it can be achieved that the conveying hose 2, compressed by the compressed air DL, can again expand more quickly. The same applies, by analogy, to the second conveying unit. For that purpose a compressed air connection 17 is provided on the housing 1.2 in order to let compressed air flow into the housing 1.2. Moreover, the housing 1.2 has a connection 18 that can be connected to a source of low pressure.

The conveying device works as follows. First, the inlet valve of the first conveying unit is closed and the outlet valve of the first conveying unit is opened. Then the conveying chamber hose 2 of the first conveying unit is compressed with the help of compressed air DL so that the volume in the conveying chamber 40.1 reduces. Subsequently, first the outlet valve of the first conveying unit is closed and then the inlet valve of the first conveying unit is opened and it is ensured that the conveying chamber hose 2 can extend again. This way, powder is sucked into the conveying chamber 40.1. Then, the inlet valve of the first conveying unit is closed again and the outlet valve of the first conveying unit is opened. If now conveying air is blown, via the connection 19, into the conveying chamber 40.1 of the conveying hose 2, the powder is conveyed out from the conveying chamber 40.1. Now the conveying chamber hose 2 is compressed again and the steps described above are repeated. The second conveying unit works according to the same principle. The two conveying units are operated such that while the one conveying unit sucks in powder from the powder reservoir, the other conveying unit conveys the powder in the direction of powder spray gun. While the one conveying hose is thus compressed, the other conveying hose expands.

The two housing parts 1.1 and 1.2 can be pipes with quadratic or rectangular cross-section.

The openings in the housing covers 1.3, 1.4, 1.5 and 1.6 can be configured such as to be oval, as shown in FIG. 2. This helps in achieving that the conveying hose is compressed parallel equally flat and the same change in shape takes place again at each operating cycle of the conveying hose.

Figure 3:
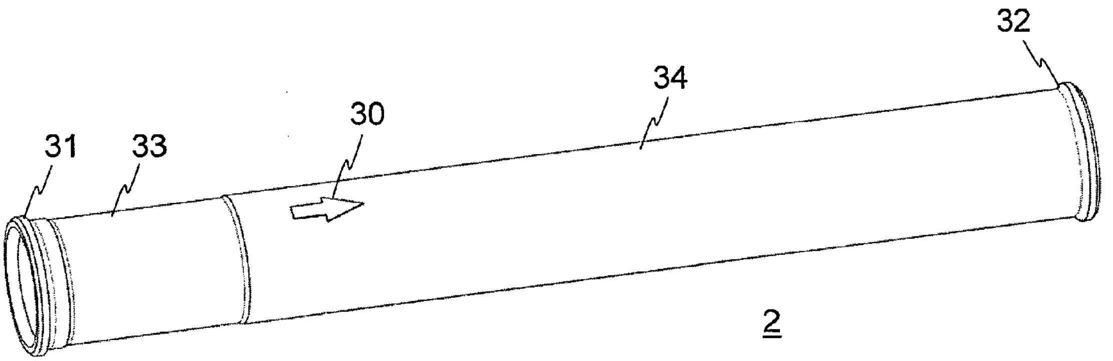
FIG. 3 shows, in a three-dimensional view, a first possible embodiment of the conveying chamber hose according to the invention as it can be used in the conveying device.
Figure 4:
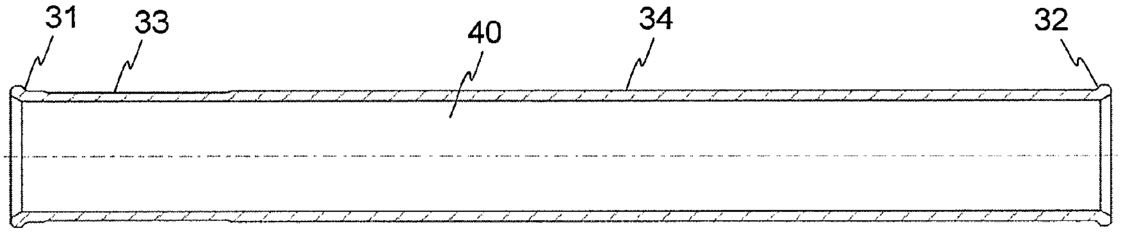
FIG. 4 shows the first embodiment of the conveying chamber hose according to the invention in a cross-section.

A first possible embodiment of the conveying chamber hose, which is also called conveying hose, is presented in a three-dimensional view in FIG. 3. The casing 34 of the conveying chamber hose 33 has a taper 33 in the area of the inlet 31. If the conveying chamber hose is loaded with compressed air, first the part of the conveying chamber hose, in which the resistance of the conveying hose is the smallest, is compressed. In the embodiment shown in FIGS. 3 and 4, this is the area 33, in which the taper is located. Only then the remaining part of the conveying hose is compressed. This way it can be achieved that the conveying hose is always compressed first on the inlet side 31 and only then in the center and on the outlet side 32. On the other hand this ensures that the powder, or respectively the fluid, present in the conveying hose 2 is conveyed out from the conveying hose, first in the area of the inlet 31, then in the center area and then in the area of the outlet 32. However, if the conveying hose would be compressed first in the center and then on the inlet 31, this could lead to the fact that the powder is not fully conveyed out from the conveying hose. Moreover, it could occur that the powder is pressed back toward the inlet side 31.

The term resistance shall mean mechanical resistance force or the mechanical section modulus. The smaller the resistance of the material is, consequently the smaller the rigidity of the material is.

In order to ensure the correct orientation of the conveying hose in the conveying unit when assembling, an arrow 30 can be drawn on the conveying hose for marking the conveying direction.

Figure 5:
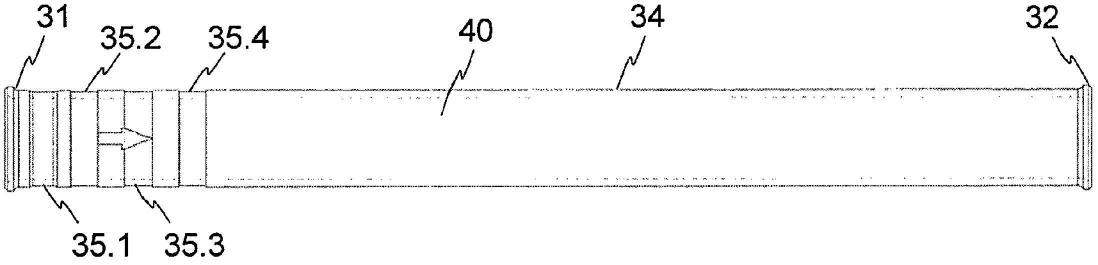
FIG. 5 shows a second possible embodiment of the conveying chamber hose according to the invention in the side view.

A second embodiment of the conveying hose is presented in the side view in FIG. 5. In contrast to the first embodiment, the conveying hose according to FIG. 5 has four tapers, from 35.1 to 35.4, in the area of the inlet. This also helps in achieving that the conveying hose has the smallest resistance in the area of the inlet 31.

Figure 6:
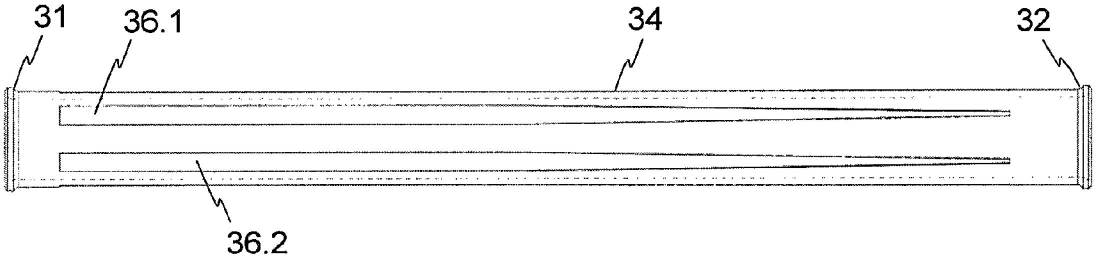
FIG. 6 shows a third possible embodiment of the conveying chamber hose according to the invention in the side view.

A third possible embodiment of the conveying hose is shown in the side view in FIG. 6. The reduction of the resistance in the area of the inlet 31 is achieved by arranging the recesses 36.1 and 36.2 on the casing surface 34 of the hose, such recesses being the largest in the area of the inlet 31 and the smallest in the area of the outlet 32.

Figure 7:
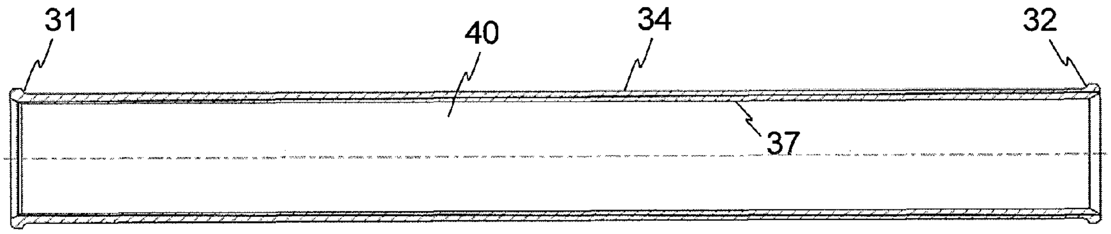
FIG. 7 shows a fourth possible embodiment of the conveying chamber hose according to the invention in the cross-section.

A fourth possible embodiment of the conveying hose is shown in the cross-section in FIG. 7. The conveying hose is formed from two layers 34 and 37, whereby the layer 37 has the smallest wall thickness in the area of the inlet 31 and the most wall thickness in the area of the outlet. Herewith it is also achieved that the conveying hose has a smaller resistance in the area of the inlet 31 than in the area of the outlet 32. The layer 34 can have the largest wall thickness in the area of the inlet 31 and the smallest wall thickness in the area of the outlet 32. If the material of the layer 34 has a smaller resistance than the material of the layer 37, so an altogether smaller resistance is achieved in the area of the inlet 31 than in the area of the outlet 32.

Figure 8:
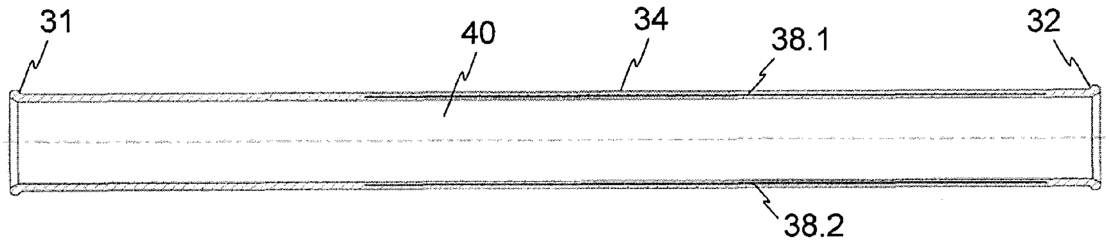
FIG. 8 shows a fifth possible embodiment of the conveying chamber hose according to the invention in a cross-section.

A fifth possible embodiment of the conveying hose is shown in the cross-section in FIG. 8. In this embodiment, the reinforcements 38.1 and 38.2 are incorporated into the conveying hose in the center area and in the end area. As a result it is also achieved that the conveying hose has a smaller resistance in the area of the inlet 31 than in the area of the outlet 32. Wires or fibers can be used, for example, as reinforcements 38.1 and 38.2. Instead of them, a woven textile or canvas serving as reinforcement can also be incorporated into the conveying hose or attached to the conveying hose.

Figure 9:
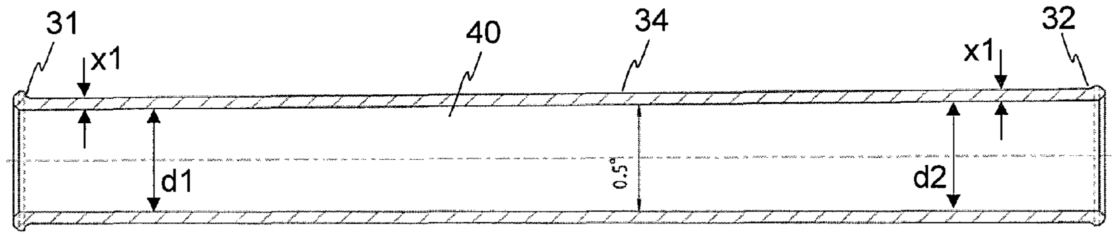
FIG. 9 shows a sixth possible embodiment of the conveying chamber hose according to the invention in a cross-section.

A sixth embodiment of the conveying hose is shown in the cross-section in FIG. 9. The wall thickness x1 remains constant across the length of the conveying hose. The inside diameter d1 in the area of the inlet 31 is however larger than the inside diameter d2 in the area of the outlet 32. This produces a conveying hose with a tapering conveying chamber 40 and a reduced resistance in the area of the inlet 31.

Figure 10:
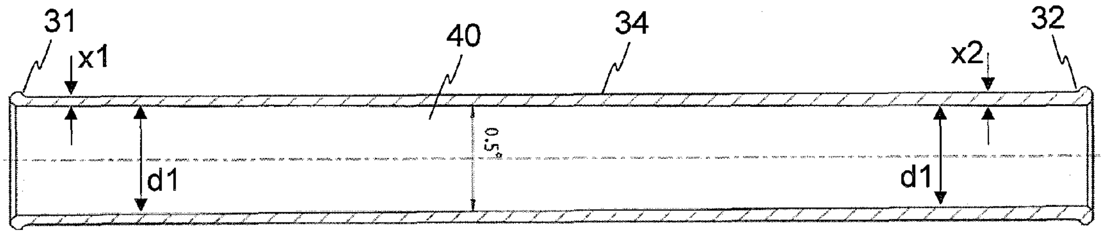
FIG. 10 shows a seventh possible embodiment of the conveying chamber hose according to the invention in a cross-section.

A seventh possible embodiment of the conveying hose is shown in the cross-section in FIG. 10. In this case the wall thickness x1 is smaller in the area of the inlet 31 than the wall thickness x2 in the area of the outlet 32. The inside diameter d1 of the conveying hose is however constant. The lesser wall thickness in the area of the inlet 31 helps in achieving that the conveying hose has a smaller resistance in the area of the inlet 31 than in the area of the outlet 32 and consequently it is compressed first in the inlet area, then in the center and finally in the outlet area.

The tapering can be for example of 0.5° for the embodiments shown in the FIGS. 9 and 10.

The preceding description of the embodiments according to the present invention is used only for illustrative purposes and not for the purpose of restricting the invention. Different alterations and modifications are possible within the framework of the invention without leaving the scope of the invention and its equivalents.

REFERENCE SIGNS

1.1 Housing for the first conveying hose
1.2 Housing for the second conveying hose
1.3 Housing cover
1.4 Housing cover
1.5 Housing cover
1.6 Housing cover
2 First conveying hose
3 Second conveying hose
4 Flange
5 Screws
6 Housing of the outlet valve
7 Valve hose
8 Y piece
9 Screws
10 Hose nipple
11 Flange
12 Housing of the inlet valve
13 Y piece
14 Hose nipple
15 Compressed air connection
16 Connection for vacuum
17 Compressed air connection
18 Connection for vacuum
19 Conveying air connection with non-return valve
20 Conveying air connection with non-return valve
21 Control connection
22 Control connection
23 Control connection
24 Control connection

30 Control connection
31 Drain boss
32 Drain boss
33 Taper
34 Casing
35.1-35.4 Tapers
36.1 Wedge-shaped recess
36.2 Wedge-shaped recess
37 Internal layer
38.1 Reinforcement
38.2 Reinforcement
40 Conveying chamber
40.1 Conveying chamber of the first conveying hose
40.2 Conveying chamber of the second conveying hose

The invention claimed is:

1. A device for conveying fluid, comprising:
an inlet valve and an outlet valve, wherein the inlet valve and the outlet valve can be controlled, and
a conveying chamber made from a conveying chamber hose being elastic and including an inlet and an outlet, and having a smallest deformation resistance toward the inlet compared to a deformation resistance toward the outlet,
wherein the conveying chamber is arranged between the inlet valve and the outlet valve,
the conveying chamber has a conveying air inlet, and
the volume of the conveying chamber can be modified by changing the shape of the conveying chamber hose.

2. A device according to claim 1, the conveying chamber hose comprising a taper to decrease deformation resistance toward the inlet.

3. A device according to claim 2, comprising one or more further tapers to decrease deformation resistance toward the inlet.

4. A device according to claim 1, the conveying chamber hose comprising a recess becoming smaller from the inlet to the outlet.

5. A device according to claim 1, the conveying chamber hose comprising several layers, in which at least one of the layers increases from the inlet to the outlet.

6. A device according to claim 1, the conveying chamber hose having wall thickness (x1, x2) that increases from the inlet to the outlet.

7. A device according to claim 1, the conveying chamber hose including reinforcement.

8. A device according to claim 1, wherein a cross-section of the conveying chamber hose is oval.

9. A device according to claim 1, wherein an inside diameter (d1, d2) of the conveying chamber hose decreases from the inlet to the outlet.

10. A device according to claim 1,
comprising a further conveying chamber made from a further conveying chamber hose,
the further conveying chamber being arranged between a further inlet valve and a further outlet valve,
the further conveying chamber has a conveying air inlet,
the volume of the further conveying chamber can be modified by changing the shape of the further conveying chamber hose, and
wherein the outlet valves are connected to each other on the outlet side.

11. A coating method, comprising the steps of:
conveying powder with the device of claim 1,
and coating a work piece with the conveyed powder.

* * * * *